May 1, 1951 — C. ADAMS — 2,550,751
ELECTRIC HEATING
Filed Sept. 26, 1947
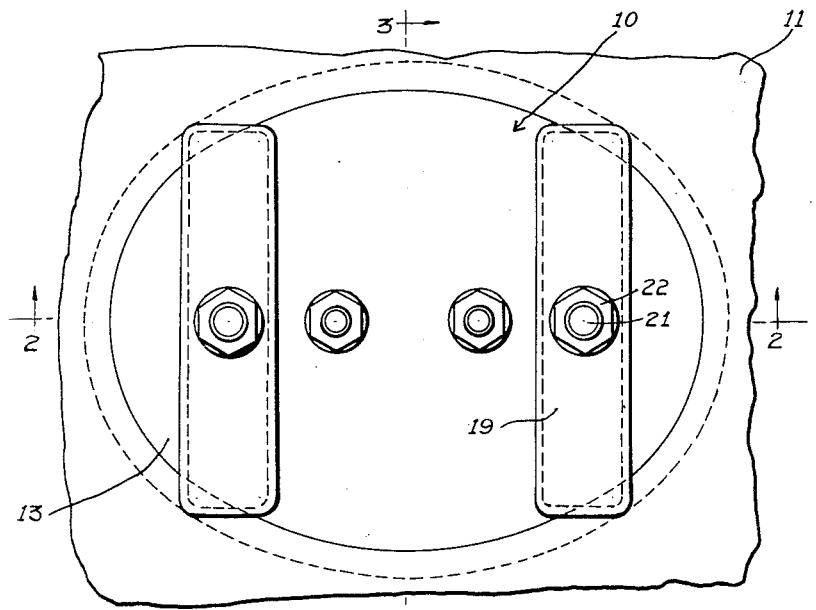
Fig. 1.
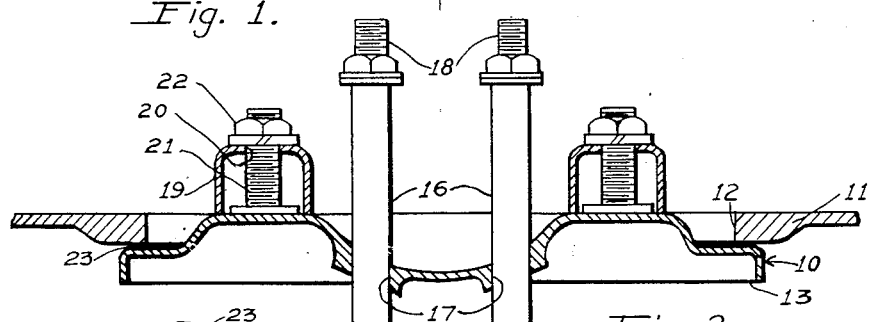
Fig. 2.
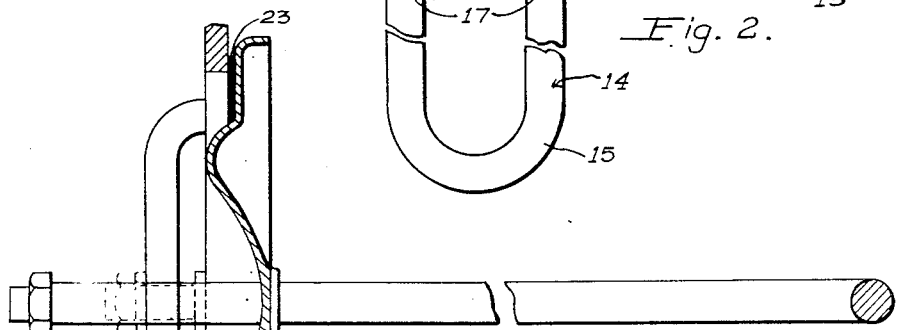
Fig. 3.
CARMAN ADAMS
INVENTOR
ATTORNEY Patented May 1, 1951

2,550,751

UNITED STATES PATENT OFFICE 2,550,751

ELECTRIC HEATING

Carman Adams, Birmingham, Mich., assignor to Edwin L. Wiegand Company, Pittsburgh, Pa., a corporation of Pennsylvania Application September 26, 1947, Serial No. 776,266

3 Claims. (Cl. 219—44)

My invention relates to electric heating, and the principal object of my invention is to provide an electric heating unit constructed to be mounted to a container at an opening in the wall of the container, adapted to be inserted from the exterior of the container, and comprising a closure plate constructed to underlie the wall of the container margining the opening in the container, whereby pressure within the container serves to increase the seal of the plate to the container.

In the drawing accompanying this specification and forming a part of this application I have shown for purposes of illustration the embodiment of my invention which I now consider to be the best means of carrying my invention into practice, and in this drawing:

Figure 1 is a plan view showing a heating unit applied to a container according to the illustrative form of my invention; and Figures 2 and 3 are sections respectively on the line 2—2 and line 3—3 of Figure 1.

The embodiment of my invention herein shown and described comprises an electric heating unit 10 constructed to be mounted to a container 11 at an opening 12 in the container 11.

As herein shown the electric heating unit 10 comprises a closure plate 13 constructed to underlie the wall of the container 11 margining the container opening 12, and a sheathed electric heating element 14 carried by the plate 13 and comprising an active section 15 disposed inwardly of the plate 13 and terminal portions 16 herein shown as extending through apertures 17 in the plate 13, welded to the plate 13 at the apertures 17, and provided at their ends with connection terminals 18 by which the element 14 may be connected to a suitable supply of electric power.

With the foregoing the parts are so constructed and arranged that the heating unit 10 may be inserted through the opening 12 in the wall of the container 11 from the outside of the container, and then moved into the position shown, with the closure plate 13 underlying the wall of the container 11 margining the opening 12, and to this purpose, in the present embodiment the opening 12, and likewise the closure plate 13, are formed elliptical in outline, and also of proper size relative to the dimensions of the heating element 14, so that this method of assembly may be accomplished.

Thereupon the heating unit 14 is held in position, according to the present embodiment, by means of a pair of channel shape bars 19 extending across the opening 12 in the container 11 and each provided with an aperture 20 for the passage of an upstanding stud 21 welded to the closure plate 13 and receiving a cooperating nut 22 by which the bars 19 may be pressing against the exterior of the wall of the container 11, thus drawing the closure plate 13 tightly against the interior of the wall of the container 11 margining the opening 12.

Preferably a gasket 23 is interposed between the margin of the closure plate 13 and the opposite margin of the wall of the container 11, and in the present embodiment the closure plate 13 is formed of sheet metal, and for the purpose of additional strength, is contained as shown.

As will be recognized by those skilled in the art, in many instances it is necessary that a heating unit be mounted to a container from the exterior of the container, for example, in hot water heaters, but with the closure plate disposed exteriorly of the container, the entire pressure within the container operates to open the attempted seal between the closure plate and the wall of the container, and thus the entire construction must be excessively heavy, otherwise the seal is very likely to leak.

On the other hand, according to my invention the parts of the heating unit are properly constructed and arranged, so that the heating unit according to my invention likewise may be inserted from the exterior of the container, but the closure plate underlies the wall of the container, and the entire pressure within the container operates not to open but to augment the seal between the closure plate and the container.

However, while the illustrated embodiment of my invention therefore accomplishes at least the principal object of my invention, likewise it will be apparent that it possesses other advantages, and further, that various changes and modifications may be made, without departing from the spirit of my invention and therefore that the disclosure herein is illustrative only, and that my invention is not limited thereto.

Wherefore I claim:

1. An electric heating unit constructed to be mounted to a substantially rigid container at a substantially fixed opening in the wall of the container, comprising a substantially rigid closure plate constructed to underlie the wall of the container margining said opening, and one or more normally rigid sheathed electric heating elements fixedly carried by said plate and comprising one or more active portions disposed inwardly of said plate and one or more terminal portions extending through and closed to said plate and provided with connection terminals accessible exteriorly of said plate, said unit being constructed and arranged to permit insertion of said unit through said opening from the exterior of the container into position with said one or more active portions and said plate disposed within said container, and movement of said unit into mounting position with said one or more active portions disposed within said container and said plate underlying the wall of said container margining said opening, and holding means constructed thereupon to hold said unit mounted to said container with said one or more active portions disposed within said container and said plate underlying the wall of said container margining said opening.

2. An electric heating unit constructed to be mounted to a substantially rigid container at a substantially fixed opening in the wall of the container, comprising a substantially rigid closure plate constructed to underlie the wall of the container margining said opening, and one or more normally rigid sheathed electric heating elements fixedly carried by said plate and comprising one or more active portions disposed inwardly of said plate and one or more terminal portions extending through and closed to said plate and provided with connection terminals accessible exteriorly of said plate, said unit being constructed and arranged to permit insertion of said unit through said opening from the exterior of the container into position with said one or more active portions and said plate disposed within said container, and movement of said unit into mounting position with said one or more active portions disposed within said container and said plate underlying the wall of said container margining said opening, and holding means overlying the exterior of said container and constructed to stress said unit outwardly, thereby to hold said unit mounted to said container with said one or more active portions disposed within said container and said plate underlying the wall of said container margining said opening.

3. An electric heating unit constructed to be mounted to a container at an opening in the wall of the container, comprising a substantially rigid closure plate constructed to underlie the wall of the container margining said opening, and one or more normally rigid sheathed electric heating elements fixedly carried by said plate and comprising one or more active portions disposed inwardly of said plate and one or more terminal portions extending through and closed to said plate and provided with connection terminals accessible exteriorly of said plate, said unit being constructed and arranged to permit insertion of said unit through said opening from the exterior of the container into position with said one or more active portions and said plate disposed within said container, and movement of said unit into mounting position with said one or more active portions disposed within said container and said plate underlying the wall of said container margining said opening, and holding means overlying the exterior of said container and constructed to act on said plate to stress said unit outwardly, thereby to hold said unit mounted to said container with said one or more active portions disposed within said container and said plate underlying the wall of said container margining said opening.

CARMAN ADAMS.

REFERENCES CITED

The following references are of record in the file of this patent:

UNITED STATES PATENTS

| Number | Name | Date |
| --- | --- | --- |
| 721,344 | Vail | Feb. 24, 1903 |
| 796,944 | Stewart et al. | Aug. 8, 1905 |
| 888,277 | Wahlquist | May 19, 1908 |
| 2,392,077 | Wilson | Jan. 1, 1946 |
| 2,401,847 | Urbant et al. | June 11, 1946 |

FOREIGN PATENTS

| Number | Country | Date |
| --- | --- | --- |
| 518,907 | Great Britain | Mar. 11, 1940 |